United States Patent [19]

te Riele

[11] 4,231,397

[45] Nov. 4, 1980

[54] METHOD OF, AND APPARATUS FOR, REGULATING THE PRESSURE IN A DEFORMABLE CONDUIT CONDUCTING A FLOWING FLUID

[75] Inventor: Johannes H. te Riele, Amersfoort, Netherlands

[73] Assignee: Remia B.V., Den Dolden, Netherlands

[21] Appl. No.: 12,154

[22] Filed: Feb. 14, 1979

[30] Foreign Application Priority Data

Feb. 17, 1978 [NL] Netherlands .......................... 7801848

[51] Int. Cl.³ .............................................. F16K 7/06
[52] U.S. Cl. .................................... 137/614.11; 251/8
[58] Field of Search ................... 251/4, 6, 7, 8; 137/1, 137/14, 614.11

[56] References Cited

U.S. PATENT DOCUMENTS

| 1,667,141 | 4/1928 | Crowley | 251/8 |
| 2,582,917 | 1/1952 | Hagaard | 251/6 |

*Primary Examiner*—Alan Cohan
*Attorney, Agent, or Firm*—Lawrence E. Laubscher

[57] ABSTRACT

A method of, and apparatus for, regulating the pressure in a deformable conduit conducting a flowing fluid is disclosed, wherein a transverse force is exercised on the conduit at positions spaced along the length thereof so as to effect a change on cross-sectional area of the conduit.

2 Claims, 2 Drawing Figures

4,231,397

METHOD OF, AND APPARATUS FOR, REGULATING THE PRESSURE IN A DEFORMABLE CONDUIT CONDUCTING A FLOWING FLUID

BACKGROUND OF THE INVENTION

This invention relates to a method of, and apparatus for, regulating the pressure in a deformable conduit conducting a flowing fluid.

It is an object of the invention to provide for the pressure in the conduit to be accurately regulated within wide limits, using simple means easy in operation, which render supervision and maintenance substantially superfluous.

SUMMARY OF THE INVENTION

According to the invention, this object is achieved in that a transverse force is exercised on the conduit at positions spaced along the length thereof so as to effect a change in cross-sectional area of the conduit.

Preferably, the forces applied at successive positions are exercised in different directions.

According to one aspect of the present invention, therefore, there is provided a method of regulating the pressure in a deformable conduit conducting a flowing fluid, characterized in that a transverse force is exercised on the conduit at positions spaced along the length thereof so as to effect a change in cross-sectional area of the conduit.

According to another aspect of the present invention, there is provided an apparatus for regulating the pressure in a deformable conduit conducting a flowing fluid, comprising at least two spaced annular housings through which the deformable conduit can be passed, the housings being interconnected by at least one fixed supporting beam having longitudinally spaced ridges, an operating rod in juxtaposition to the supporting beam, said operating rod having longitudinally spaced ridges in opposition to, and extending in the direction of, the ridges of the supporting beam, and means accomodated in said housings for moving the operating rod towards, and away from, said supporting beam.

BRIEF DESCRIPTION OF THE FIGURES

One embodiment of the invention will now be described, by way of example, with reference to the accompanying drawings. In the drawings.

DETAILED DESCRIPTION

Figure 1:
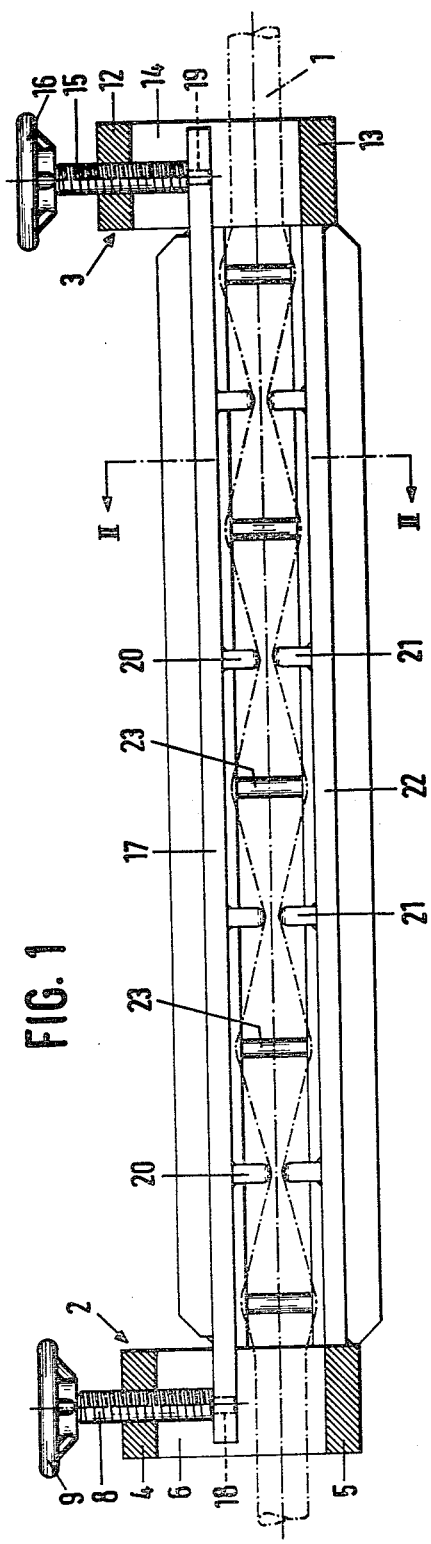
FIG. 1 is a longitudinal sectional view of an apparatus according to the invention.
Figure 2:
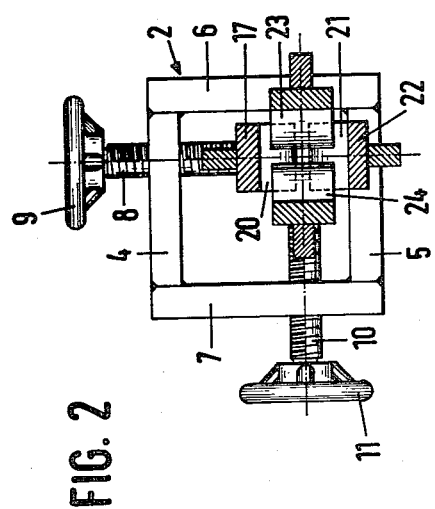
FIG. 2 is a cross-sectional view, taken on the line II—II of FIG. 1.

Referring to the drawings, there are shown two annular housings 2,3, through which a tube or hose 1 of deformable material is passed. Housing 2 is spaced some distance from the identical housing 3. Housings 2 and 3 are interconnected by at least one supporting beam 22. As shown in FIG. 2, each housing 2, 3 is built up from four short beam members, e.g. 4, 5, 6 and 7, interconnected, for example, by welding. In beam member or wall 4 of housing 2, a threaded spindle 8 with a handwheel 9 is mounted for rotation. A threaded spindle 10 with a hand wheel 11 is mounted for rotation in wall 7. Housing 3 is identical to housing 2. In wall 12 thereof, a threaded spindle 15 with a hand wheel 16 is mounted for rotation. Of the other walls, walls 13 and 14 are visible in FIG. 1. Another threaded spindle with a hand wheel is mounted for rotation in the wall not shown opposite to wall 14.

Extending between spindles 8 and 15 is an operating rod 17 having openings in which these spindles are received with a stud 18, 19, respectively. Provided on rod 17 are ridges 20 spaced along the length of the rod.

Corresponding ridges 21 are provided on a supporting beam 22, which connects housings 2 and 3, so that ridges 21 are in opposition to ridges 20 of rod 17.

Positioned intermediate successive pairs of ridges 20 and 21 are ridges 23, 24, which are provided on a second supporting beam and a second operating rod, respectively and, relative to ridges 20, 21, are angularly off-set by 90° C. Similarly to ridges 20, ridges 24 are movable in the direction of the opposed ridges 21, and 23, respectively.

When hand wheels 9 and 16 are turned, the distance between ridges 20 and 21 is decreased or increased. As a result, the tube or hose 1 mounted between them is constricted at a plurality of positions, as shown in FIG. 1. The passage is deformed into a wide, substantially rectangular slot.

By rotating the other hand wheels, whose spindles are at an angle of, for example, 90° to spindles 8 and 15, ridges 23 and 24 can also be moved towards or away from each other. As a result a slot-shaped constriction is formed in the hose intermediate the pair of ridges 23, 24, which slot-shaped constriction is at an angle of, for example, 90°, to the slot between the pair of ridges 20, 21. This condition is shown in FIG. 2.

In this way the pressure in tube 1 carrying a flowing fluid can be accurately controlled within wide limits.

The elements acting on tube 1 do not come into contact with the fluid flowing through the conduit, so that these elements are not subject to attack from it, and hence maintenance can be substantially omitted.

As appears from FIG. 2, the passage in conduit 1 is co-axial with it. When throughflow along the wall of the conduit is desired, a core with a plurality of thickened parts can be mounted co-axially within the conduit, with the thickened parts having a diameter in excess of the smallest passage diameter between a pair of co-operating ridges 20, 21. Naturally such a thickened part will be positioned between two successive pairs of ridges 20, 21 or 23, 24.

Another possibility of imparting a zig-zag shape to the passage through the conduit 1 consists in making ridges 21 and 23 higher than the co-operating ridges 20, 24.

I claim:

1. Apparatus for regulating the pressure of a fluid flowing in a deformable conduit, comprising
  (a) at least two spaced annular housing means through which the deformable conduit passes;
  (b) first fluid pressure control means arranged between said spaced annular housing means in a first plane and including
    (1) a first fixed support beam connected at opposite ends with said housing means and including a plurality of first longitudinally spaced ridges;
    (2) first operating rod means arranged opposite said first beam and including a plurality of second longitudinally spaced ridges arranged opposite, and extending in the direction of, said first ridges to define a plurality of first opposed pairs of ridges; and (3) first means connected with each of said housing means, respectively, for displacing said first operating rod means relative to said first support beam; and (c) second fluid pressure control means arranged between said spaced annular housing means in a second plane normal to said first plane and including
   (1) a second fixed support beam connected at opposite ends with said housing means and including a plurality of third ridges longitudinally spaced between said plurality of first ridges;
   (2) second operating rod means arranged opposite said second beam and including a plurality of fourth longitudinally spaced ridges arranged opposite, and extending in the direction of, said third ridges to define a plurality of second opposed pairs of ridges, the flexible conduit being arranged between said first and second pairs of ridges, respectively; and
   (3) second means connected with each of said housing means, respectively, for displacing said second operating rod means relative to said second support beam, whereby displacement of said first and second operating rods changes the cross-sectional area of the flexible conduit, thereby to control the pressure of fluid flowing therethrough.

2. Apparatus as defined in claim 1, wherein one of said ridges of each of said first and second opposed pairs of ridges, respectively, has a greater length than the other of said ridges, said ridges of greater length extending beyond the centerline of the mounted, empty conduit.

* * * * *